(12) United States Patent
Artyushkova et al.

(10) Patent No.: US 8,045,140 B2
(45) Date of Patent: Oct. 25, 2011

(54) METHOD FOR MULTIVARIATE ANALYSIS OF CONFOCAL TEMPORAL IMAGE SEQUENCES FOR VELOCITY ESTIMATION

(75) Inventors: Kateryna Artyushkova, Albuquerque, NM (US); Mangesh Bore, Bellevue, WA (US); Gabriel Lopez, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 12/288,447

(22) Filed: Oct. 20, 2008

(65) Prior Publication Data

US 2009/0148001 A1 Jun. 11, 2009

Related U.S. Application Data

(60) Provisional application No. 60/999,640, filed on Oct. 18, 2007.

(51) Int. Cl.
*G01P 3/36* (2006.01)
(52) U.S. Cl. ......................................... 356/28
(58) Field of Classification Search ............ 356/28, 356/28.5; 382/107
See application file for complete search history.

(56) References Cited

U.S. PATENT DOCUMENTS

| | | | | |
|---|---|---|---|---|
| 5,110,204 A * | 5/1992 | Miles et al. | | 356/28 |
| 5,828,444 A * | 10/1998 | Nomura | | 356/28 |
| 6,256,096 B1 * | 7/2001 | Johnson | | 356/335 |
| 6,653,651 B1 * | 11/2003 | Meinhart et al. | | 250/573 |
| 2008/0003665 A1 * | 1/2008 | Potyrailo et al. | | 435/287.2 |
| 2009/0103091 A1 * | 4/2009 | Jones et al. | | 356/342 |
| 2009/0190822 A1 * | 7/2009 | Ortyn et al. | | 382/134 |

FOREIGN PATENT DOCUMENTS

| EP | 1757223 A2 * | 2/2007 |
|---|---|---|
| WO | WO 9810097 A2 * | 3/1998 |

OTHER PUBLICATIONS

Anthony L. Garcia, Electrokinetic molecular separation in nanoscale fluidic channels, Lab. Chip, 2005, 5, pp. 1271-1276.

Petra S. Dittrich, Spatial Two-Photon Fluorescence Cross-Correlation Spectroscopy for Controlling Molecular Transport in Microfluidic Structures, Anal. Chem. 2002, 74, 4472-4479.

Marco Tagliasacchi, A genetic algorithm for optical flow estimation, Image and Vision Computing, 2007, 25, 141-147.

Joaquim Jaumot, Application of multivariate analysis resolution methods to the study of biochemical and biophysical processes, 2004, 327, 1-13.

Stephen P. Gruden, Analysis of video images from a gas-liquid transfer experiment: a comparison of PCA and PARAFAC for multivariate imae analysis, J. Chemometrics, 2003, 17,400.

Emmile Sahouria, Content Analysis of Video Using Prinicpal Components, IEEE Transactions on Circuits and Systems, 1991, 9, 8, 1290-1298.

Barry M. Wise, A Brief Introduction to Multivariate Analysis (MIA), http://www.eigenvector.com/Docs/MIA Intro pdf, 2000.

Willem Windig, Interactive Self-Modeling Mixture Analysis, Anal. Cem., 1991, 63, 1425-1432.

(Continued)

*Primary Examiner* — Isam Alsomiri

(57) ABSTRACT

A method of determining individual velocity associated with one or more molecular species moving through a fluid medium involves obtaining multiple temporal images of the one or more species moving through the medium, analyzing the temporal images using multivariate image analysis to obtain temporal profiles of principal components, and determining individual velocity of the one or more species using the temporal profiles. Multiple species can be identified using the one or more individual velocities or ratio thereof.

15 Claims, 18 Drawing Sheets

OTHER PUBLICATIONS

Zhen Yuan, Electrokinetic transport and separations in fluidic nanochannels, Electrophoresis, 2007, 28, 595-610.

Roam Tauler, Selectivity, Local Rank, Three-Way Data Analysis and Ambiguity in Multiariate Curve Resolution, J. of Chemometrics, 1995, 9, 13, 31-58.

Anna de Juan, Spectroscopic imaging and chemometrics: a powerful combination for global and local sample analysis, Trends in Analytical Chemistry, 2004, 23, 1, 70-79.

Mark Lowry, Imaging solute Distribution in Capillary Electrochromatography with Laser Scanning Confocal Microscopy, Anal. Chem. 2002, 74, 1811-1818.

Leon M. Bellan, Direct mesurement of fluid velocity in an electrospinning jet using particle iamge velocity, J. of Applied Physics, 2007, 102, 094308-1.

Lisa George, Flow Characterization of a Polymer Electronic Fuel Cell Manifold and Individual Cells Using Particle Image Velocimetry, transaactions of the ASME, 2007, 4, 272-279.

D. Sinton, Microscale flow visualization, Microfluid Nanofluid, 2004, 1:2-21.

V. K.Natrajan, Microscopic particle imae velocimetry measurements of transition to turbulence in microscale capillaries, Exp. Fluids, 2007, 43:1-16.

Dimitry A Markov, Noninvasive fluid flow measurements in microfluidic channels with backscatter interferometry, Electrophoresis, 2004, 25, 3805-3809.

C.B.J. Bergsma, Velocity estimation of Spots in Three-Dimensional Confocal Image Sequences of Living Cells, Cytometry, 2001, 43: 261-272.

Dimiter N. Petsev, Theory of transport in nanofluidic channels with moderately thin electrical double layers: Effect of the wall potential modulation on solutions of symmetric and asymmetric electrolytes, The J. of Chemcial Physics. 2005, 123, 244907.

\* cited by examiner

METHOD FOR MULTIVARIATE ANALYSIS OF CONFOCAL TEMPORAL IMAGE SEQUENCES FOR VELOCITY ESTIMATION

This application claims priority and benefits of provisional application Ser. No. 60/999,640 filed Oct. 18, 2007.

FIELD OF THE INVENTION

The invention relates to a method for determining individual characteristic velocity associated with one or more molecular species moving through a fluid medium by using multiple temporal images as the one or more species moves through the fluid medium useful for detecting species associated with analyte(s).

BACKGROUND OF THE INVENTION

The ability to measure fluid velocity is important for realizing a full potential of micro- and nano-fluidics, especially for assays, where multiple screening events are required. Recent work has demonstrated that confinement of electrokinetic molecular transport in fluidic channels with transport limiting pore sizes of nanoscopic dimensions (approximately 100 nm) gives rise to unique molecular separation capabilities (references 1 and 2). Understanding fluid and molecular transport in nanoscopic channels is a tremendous challenge because of the lack of experimental methods that are available for interrogating the positions and trajectories of molecules at sub-wavelength dimensions. Silicon-based T-chips containing an array of parallel nanochannels can be used to study the electrokinetic transport of fluorescent dyes in nanochannels. Fluorescent imaging using confocal microscopy is an excellent method for the direct observation of molecules in chemical separation due to its high sensitivity (reference 3). While the details for the flow profiles in the individual nanochannels are below the resolution limit of optical microscopy, average velocities of dye fronts can be monitored and provide insight into the electrokinetic transport mechanisms in the nanochannels. Simultaneous transport of positive and negative dyes in the channels provides better understanding of the electrokinetic mechanism of separation.

Microscale flow visualization methods applied for the determination of fluid velocity in Microsystems is a well addressed. (references 4 through 9). The task of change detection is to determine how much and in what direction has a pixel changed. Velocity estimation methods can be roughly divided into two groups: particle and model-based spot tracking methods and image derivative based methods like optical flow. The types of movement generally studied by these methods usually involve discrete object or multiple objects that are changing their location within an image field of view. The particles are often added into the fluid, such that the transport is detected but not altered. Spot-tracking methods rely on accuracy of the segmentation of characteristics objects, such as particles or cells. No segmentation is needed for optical flow methods. The overall or "average" velocity describing all objects moving within a system of study is obtained by these methodologies. For movement of dye front within an array of nanochannels, the transport properties are quite different; namely, there are no discrete objects for which intensity profiles can be monitored as a function of time. The front moves as a plug profile in the array of nanochannel. With time, the nanochannels are getting filled up by the dye, which may or may not leave the entrance side of the nanochannels. Moreover, "average" velocity is not a useful parameter in studying separation of species moving with different velocities within micro- and nanochannels. For such type of movement, velocity calculation is done manually through plotting a large number of horizontal profiles within each confocal image from individual channels capturing only one type of fluorescing species (red or green) and determining the position of the dye front from those horizontal profiles. This is time-consuming and somewhat subjective procedure. The large number of horizontal profiles needs to be processed to obtain an accurate representation of average velocity of the dye front.

Nanofluidic arrays typically involve the use of very small sample volumes. This very small sample volume makes forming analyte "bands" and detection of individual molecular velocities by traditional means difficult. Furthermore, as with gels, electrophoretic (cross-reactive) analytes may require different analysis times and thus optimal placement relative to the array.

SUMMARY OF THE INVENTION

The present invention provides a method of determining individual velocity associated with one or more molecular species moving through a fluid medium that can be useful in the detection of one or more molecular species that can be associated with one or more analytes for use in detection thereof.

An embodiment of the present invention involves obtaining multiple temporal images of one or more species moving through the medium, analyzing the temporal images using multivariate image analysis to obtain temporal profiles of principal components, and determining individual velocity of the one or more species using the temporal profiles.

In a particular embodiment when different species are simultaneously moving through the medium, the ratio of times for intersection of the temporal profiles of certain principal components is correlated with the ratio of velocities of the different species. The ratio of velocities can be determined using the principal components obtained from temporal images of only one of the species; that is, the presence and velocity of the other species can be determined advantageously without having to obtain temporal images of that other species, although temporal images of both species can be used.

The invention is advantageous in that when different species are simultaneously moving through the medium, the velocity determination can be made before there is any visual separation of the species in the medium.

The present invention can be practiced in connection with various molecular separation techniques including, but not limited to, nanochannel electrophoresis, microchannel capillary electrophoresis and gel electrophoresis. The present invention is further advantageous in that it provides capability to detect the separation of species with or without labeling and to provide an accurate ratio of their velocities even at the very early, pre-visual stage of separation.

Certain embodiment of the invention will be described below in more detail in connection with the following drawings.

DETAILED DESCRIPTION OF THE INVENTION

For purposes of illustration and not limitation, the present invention will be described below in connection with simultaneous movement of different species through a fluid medium in one or more microchannels or nanochannels and temporal images obtained by confocal fluoresence microscopy with identification of transport velocities of the different molecular species using multivariate image analysis techniques. The transport velocity/velocities can be provided to a visual display device, a printer, or data storage and used to identify one or more species based on characteristic velocity, velocities, or ratio thereof. In these illustrative embodiments, species are transported through the medium by differential molecular transport in the presence of an applied electric field (such as for electroosmosis or electrophoresis) or in the absence thereof (such as chemical potential or affinities for chromatography). However, practice of the invention is not limited to these illustrative embodiments. For example, the invention can be practiced using one or multiple different species moving through the fluid medium, which can reside in a passage of any appropriate shape not limited to a channel. Optical techniques other than fluorescence microscopy can be used to obtain images for analysis by multivariate image analysis techniques, which include, but are not limited to, PCA and MCR, to effect identification of transport velocities and velocity ratios of different molecular species. The embodiments below involve application of PCA and MCR to a large set of confocal temporal image sequences, obtained for different sizes of nanochannels at different experimental conditions, to determine and test the criteria for velocity estimation. The PCA and MCR analysis techniques are used to analyze of temporal data sets for determining velocity of moving species fronts through the fluid medium. The PCA and MCR methods allow fully exploiting the data by analyzing all pixels within images and using the temporal dimension, in contrast with manual methods, were a limited number of horizontal profiles being processed. PCA and MCR techniques are described in references 13, 14 and 15. The shortcomings of PCA technique, which involve the rotational ambiguity of the solution and difficulties in visual interpretation of extracted loadings and score images as they contain negative values, are overcome by applying physically meaningful constraints, such as nonnegativity in self-modeling methods, such as MCR. The PCA and MCR methods allow fully exploiting the data by analyzing all pixels within images and using the temporal dimension, in contrast with manual methods, where a limited number of horizontal profiles is processed.

The following exemplary embodiments thus are offered for purposes of illustration and not limitation.

(A) Experimental

Data Acquisition

Figures 1A, 1B:
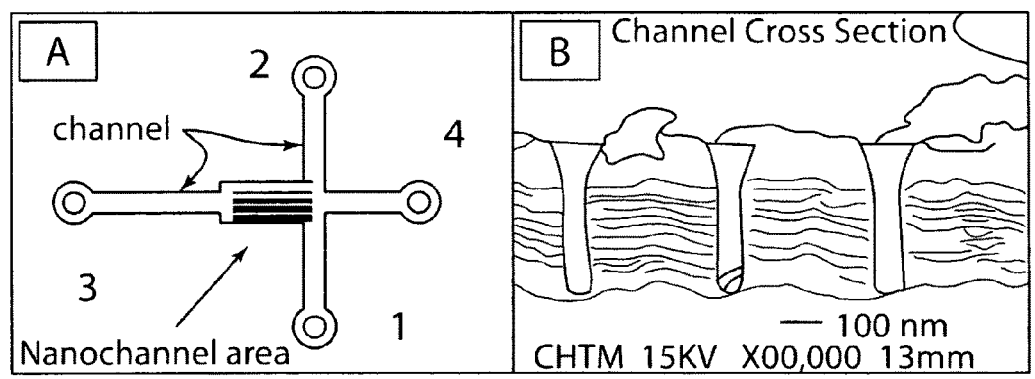
FIG. 1a is a top or plan view (schematic) of the integrated T-chip having a T-shaped channel. The holes are numbered for reference, and nanochannel area is noted. The channels are 3 cm long from well 3 to well 4, and 2 cm from well 1 to well 2.
FIG. 1b is an SEM image of the cross section of the nanochannel array (50 nm wide nanochannels) in a chip taken after experiments were performed showing a Pyrex lid bonded to the oxidized silicon trenches to form channels.

FIG. 1a illustrate a silicon-based T-chip having an integrated array of parallel nanochannels with microchannels, for fluid control and macroscopic injection ports. A cross-sectional scanning electron micrograph of a small number of nanochannels in one of the T-chips is shown in FIG. 1b. In this chip, the channels are approximately 50 nm wide by 500 nm deep, and are on a 400 nm pitch.

Electrokinetic separations used a buffer containing 0.25M tris-(hydroxy)aminomethane hydrochloride and 1.92 mM glycine at pH 8.8 (viz., a 1/100 dilution of the standard poly (acrylamide) gel electrophoresis buffer). Solutions of dyes (rhodamine B (MW=479 Da) and Alexa 488 maleimide (MW=720 Da), Molecular Probes Inc.) were prepared in this buffer, each at a concentration of 5 mg/mL. At pH 8.8, rhodamine B is neutral and Alexa 488 maleimide has a charge of −2. They will be referred to as Red and Green throughout the description below.

Electrode 2 (see FIG. 1A) was grounded, while the remaining 3 electrodes were attached to the outputs of three separate DC power supplies (not shown). The T-chip was filled with buffer (no dyes) via capillary action from well 3 and placed under an upright, laser-scanning confocal microscope (Zeiss Axioskop with an LSM5 scanning head). Ten μL of a 1:1 mixture of the two dye solutions were introduced into well 1, and initially electrode 1 was set to +30 V relative to electrode 2 (electrodes 3 and 4 were set to 0 V) so that the solution moved from well 1 towards well 2 by electroosmosis in the microchannel. Separation of the two dyes was not observed in the microchannels during this step. Once the dye mixture (as monitored by fluorescence microscopy) reached the T-intersection, electrode 1 was set to 0 V and electrode 4 was set to a varied value of voltage, V, so the fluid flowed towards well 3 through the nanochannels via electroosmosis. The time evolution of the dye fronts through the nanochannel array was followed by acquiring a series of confocal images.

Three sizes of nanochannels were studied: 50 nm, 90 nm and 160 nm. For 50 nm, three voltages of 15, 20 and 60 V were used. For 90 nm T-chip, 40 V was used, while for 160 nm, three voltages of 8, 24 and 50 were used. In all of these experiments Rhodamine (Red) and Alexa 88 (Green) dyes were injected simultaneously. Time difference between consecutive image acquisitions for 160 nm channels is 7.87 sec and 5 sec for 50 and 90 nm channels.

Manual Image Processing

Figure 2:
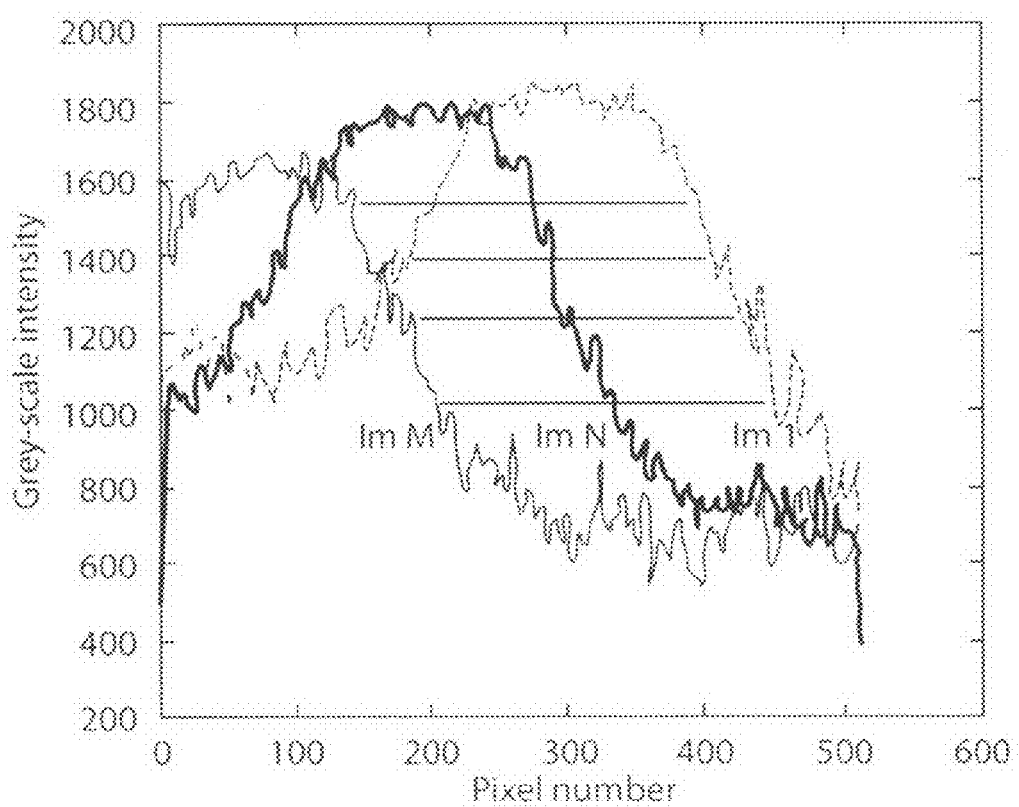
FIG. 2 shows manual determination of velocities. Overall intensity profiles are plotted for each image. Multiple horizontal lines are drawn to calculate number of pixels shifted from image 1 to image N.

For manual calculations of velocity, images were smoothed using a Gaussian smoothing. A horizontal fluorescence intensity line profile was drawn to determine the position of the dye front (as shown in FIG. 2). Most intensity profiles produced a 'step-like' spike in intensity which made it easy to determine the position of the front. In cases where the intensity had a more gradual increase, the front was noted as being the horizontal position at which the fluorescence intensity was 5% of the maximal intensity. The positions of the dye fronts were noted in at least five places (i.e. five horizontal line profiles taken) for each image. Finally, the dye velocity was determined by calculating the change in position from image to image and dividing that by the time interval between the images. The reported dye velocity was an average of the velocities calculated in this manner for all 5 line profiles and all time intervals.

The distance traveled by the dye was manually evaluated from the images as well. For most of the data sets, the $1^{st}$ image has a front of the dye just entering the channel, and the front exits the end of the channel prior to the last image in the sequence. It is accomplished by supervising acquisition and turning confocal image acquisition on and off. For such data sets, full channel length, i.e. 2000 micron, is traveled by dye front. For some image sequences, the $1^{st}$ image may have the front already moved in by some distance or the front may not reach the exit of the channels by the end of acquisition. In these image sequences the distance traveled was evaluated from horizontal profiles as described above.

Table 1 shows image sequences acquired with total number of images in them, total time of acquisition and distance traveled by the dye determined from horizontal profiles.

Data Analysis Approach

Figure 12:
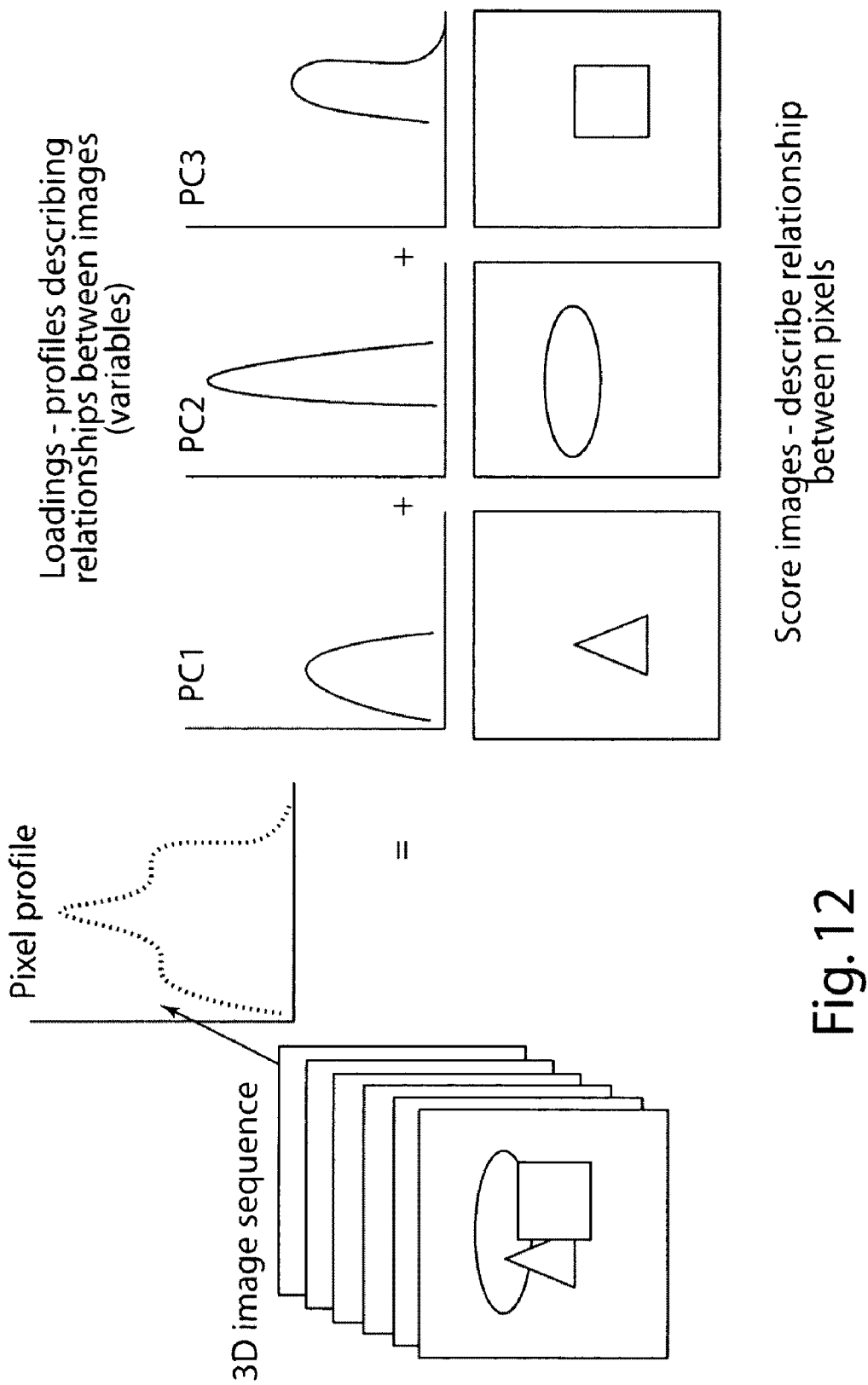
FIG. 12 is a schematic view of the multivariate PCA image analysis technique of a series of images.
Figure 13:
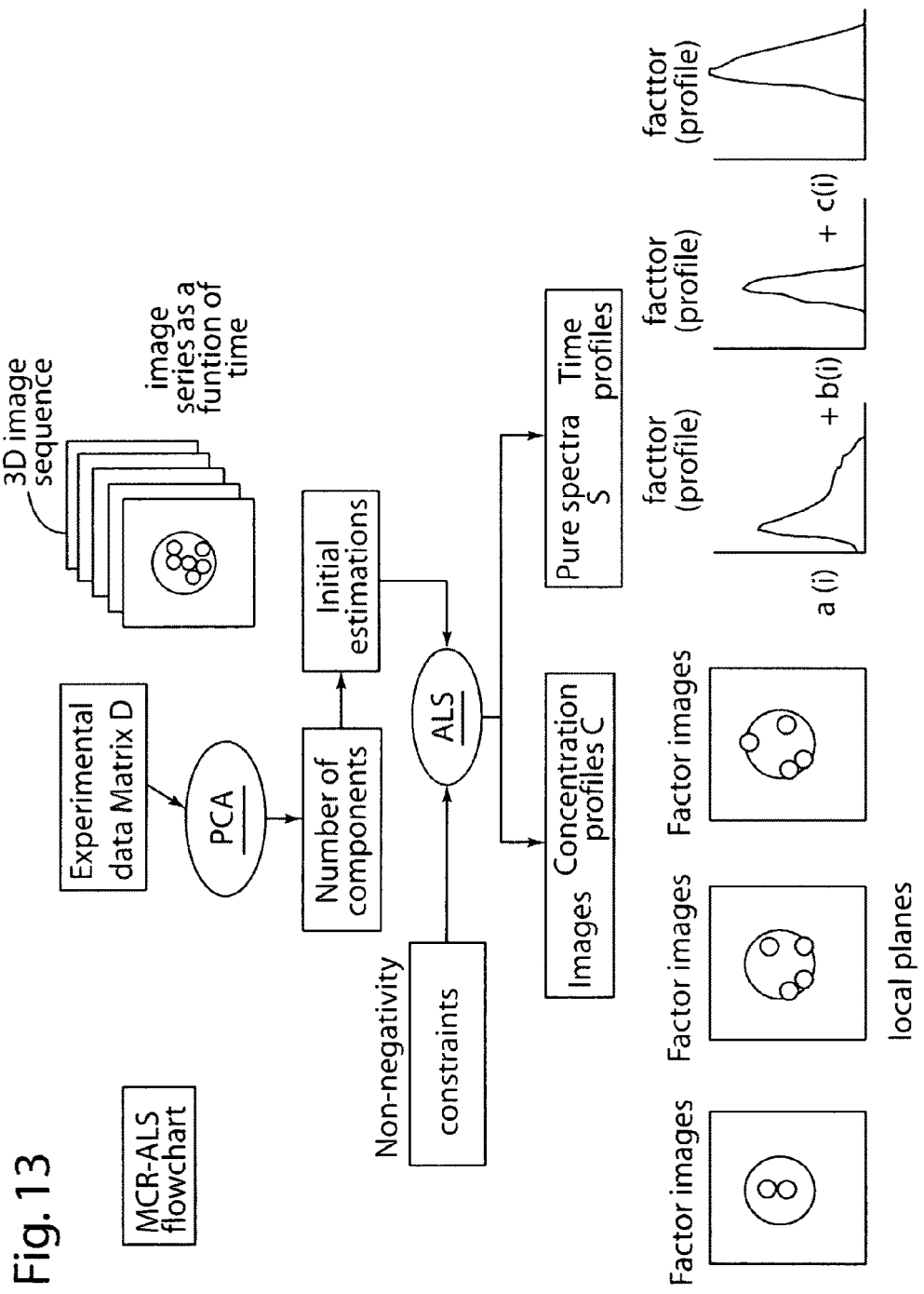
FIG. 13 is a flow chart illustrating a multivariate image analysis technique including PCA and MCR of confocal temporal data sets where the image series shown is selected for purposes of illustration only not related to channel images described below to simply explanation of the technique.

Principal Component Analysis (PCA), the most widely used MVA method, is often the starting point in multivariate data analysis. PCA transforms the experimental data matrix into a smaller number of principal components, each having a score and loading associated with it, FIG. 12. Each loading, V, has an eigenvalue that describes, in principle, the amount of variance explained by the loading. The primary components corresponding to the largest r eigenvalues represent the set of components that span the true subspace for the data, while the remaining components, each describing a low variance, represent the noise in the data set. A variety of different methods can be used as an extension of PCA to solve rotational ambiguity in the data analysis in order to extract positive, and potentially more chemically meaningful, components. One of the methods, multivariate self-modeling curve resolution (MCR), refers to a group of techniques which recover the spectral and time or intensity profiles of components in an unresolved and unknown mixture for which no prior information is available about the nature and composition of these mixtures. MCR utilizing an Alternating Least Squares (ALS) algorithm uses information from PCA for initialization and local physical constraints, where in conventional MCR terminology, D=CS where S is spectra and C is concentration profiles and when "translated" to temporal images, S is images and C is temporal profiles, FIG. 13.

For both PCA and MCR, each image [n×m] is first unfolded into a vector [n*m×1], and an algorithm is applied to a matrix formed by combining the vectors for p variables (times) into a 2-D matrix [n*m×p]. The resulting score vectors [n*m×r] are then converted back to an image format [n×m×r]. Because of this transformation, multivariate methods do not take into account spatial interrelationship between pixels in images, which may benefit the average velocity calculations. As will be seen from images in sequences, the dye may enter nanochannels of array at slightly different times, so the front will be not uniformly distributed along the vertical dimension of the array. Care, thus, should be taken when velocity is calculated manually to obtain an accurate representative of average velocity of the dye front, which is accomplished by averaging results from 5 profiles. In case of PCA and MCR, though, the spatial relationships are ignored, while the overall image intensity is used to model a difference between images at two consecutive times, therefore serving as accurate representation of "overall" or "average" intensity changes with time.

TIFF images (tagged image file format) images were opened in Matlab software (*MATLAB: The Language of Technical Computing*. The Mathworks, Inc., Natick, Mass.). Green and red channels representing Rhodamine B and Alexa 88, respectively, were saved in separate image sequences and a blank (empty) channel image was also saved, while the blue TIFF image was unused. The inventors refer to green dye in Green channel and red dye in Red channel throughout the description. RGB TIFF f images containing both red and green channels (both dyes) were converted to grayscale and saved as separate image sequence (referred to as Mix).

Figure 6:
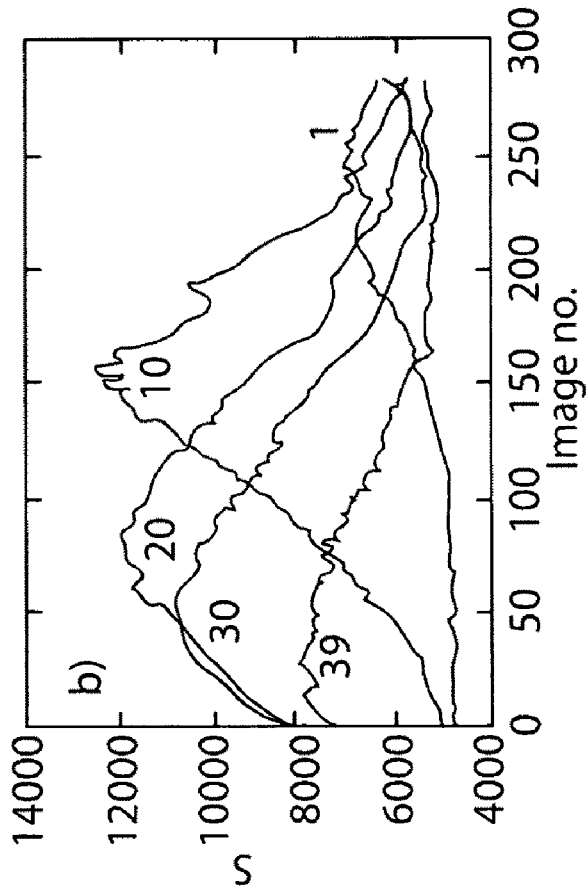
FIG. 6 shows averaged horizontal profiles along the length of the nanochannel for the image #'s shown where 0 on the horizontal axis corresponds to the exit end of the nanochannel and 300 on the horizontal axis corresponds to the entrance of the nanochannel. Intensity is displayed on the vertical axis.

Image PCA and MCR from PLSToolbox 4.1 PLS from Eigenvector Research Inc. was used within the MatLab software. PCA was applied using no scaling option using 3 PCs (principal or pure components PC1, PC2, PC3). The extracted temporal profiles were then used as an initialization for MCR-ALS algorithm shown in FIG. 6 illustrating a flow chart of data analysis pursuant to an illustrative embodiment of the invention. Nonnegativity constraints in both spatial and temporal directions were applied in MCR. Velocity calculations from MCR results are discussed next. PARAFAC 3D analysis software was also used to analyze the temporal images in some tests. This software is available as part of the PLSToolbox 4.1 PLS from Eigenvector Research Inc.

Results and Discussion

Original Image Sequences

Figure 3D:
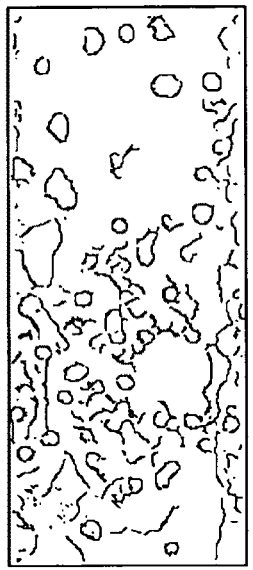
FIGS. 3a, 3b, 3c, 3d, and 3e show original confocal images from the Green channel, 160 nm, 8V with image #1 in FIG. 3a, image #25 in FIG. 3b, image #50 in FIG. 3c, image #75 in FIG. 3d, and image #100 in FIG. 3e being displayed.
Figure 3E:
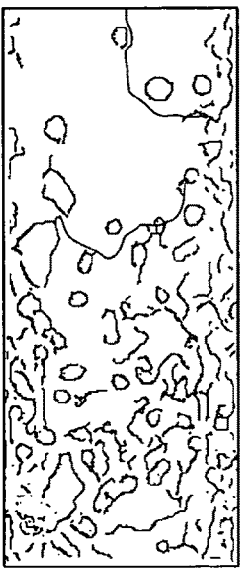
Figure 3F:
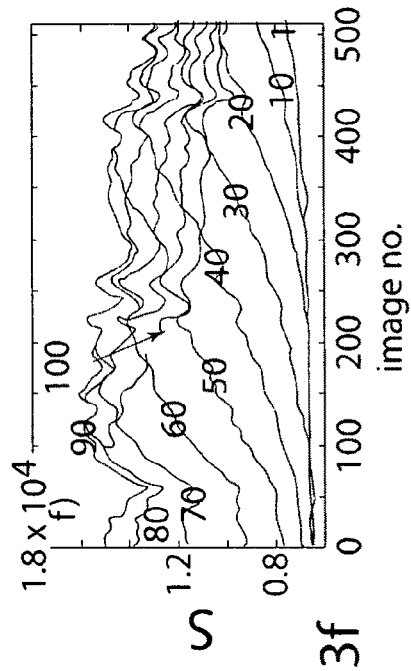
FIG. 3f shows averaged horizontal profiles along the length of the nanochannel for the image #'s shown where 0 on the horizontal pixel number axis corresponds to the exit end of the nanochannel and 500 on the horizontal axis corresponds to the entrance of the nanochannel. Intensity is displayed on the vertical intensity axis.
Figure 3A:
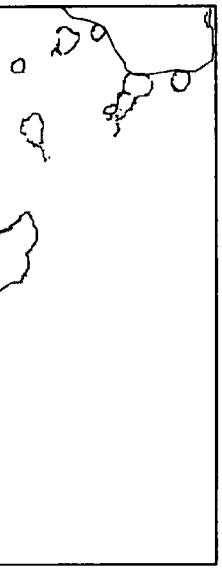
Figure 3B:
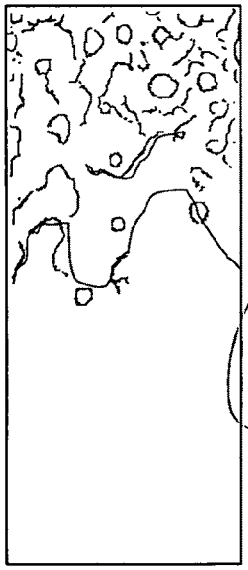
Figure 3C:
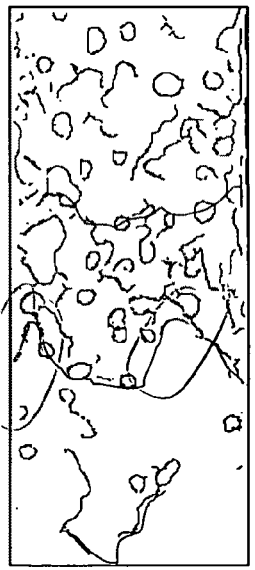
Figure 4D:
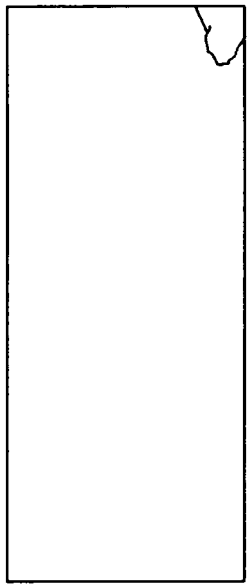
FIGS. 4a, 4b, 4c, 4d, and 4e show original confocal images for Red channel, 160 nm, 8V with image #1 in FIG. 4a, image #25 in FIG. 4b, image #50 in FIG. 4c, image #75, and image #100 in FIG. 4e being displayed.
Figure 4E:
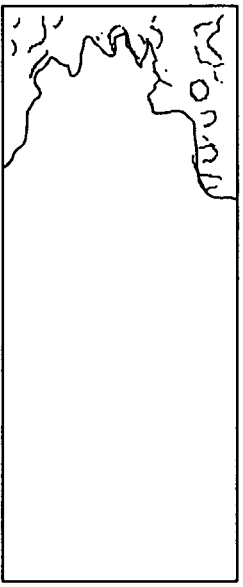
Figure 4F:
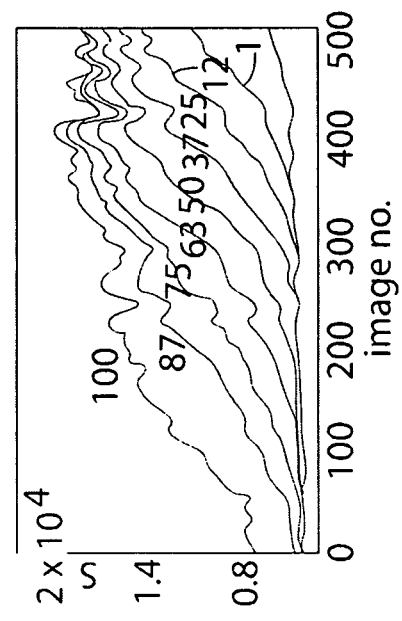
FIG. 4f shows averaged horizontal profiles along the length of the nanochannel for the image #'s shown where 0 on the horizontal pixel number axis corresponds to the exit end of the nanochannel and 500 on the horizontal pixel number axis corresponds to the entrance of the nanochannel. Intensity is displayed on the vertical axis.
Figure 4A:
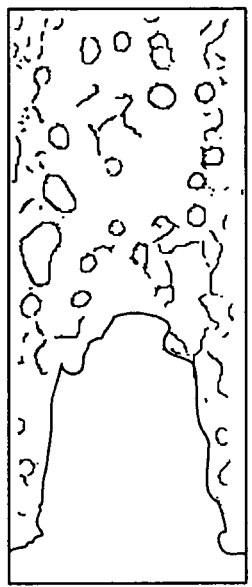
Figure 4B:
Figure 4C:
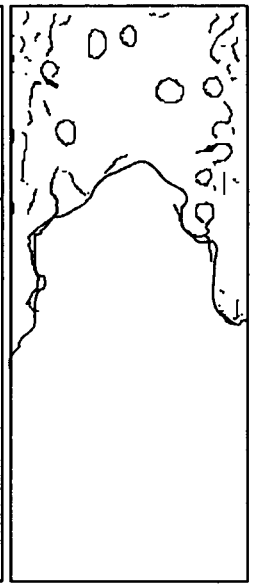

FIGS. 3a through 3e show a subset of 5 images out of 100 images for Green channel acquired from 160 nm chip at 8V. The dye front is moving from right to left side of the image within the array of nanochannels. Increase of intensity with each consecutive image in observed. At image #75 the array is completely filled with the dye. By the end of the run (image #100) the intensity has decreased at the entrance side (right). In Red channel for the same experiment (FIG. 4a through 4e), the dye front propagates by some distance into a channel, while intensity of the dye at the entrance side of the image does not decrease. These two types of temporal behavior, that were observed throughout all image sequences analyzed, are better visualized by plotting average horizontal profiles for series of images. In FIG. 3f, the profile for the first image #1 (Green channel) is a flat line. For image #10, an increase of intensity at the entrance (right) side of the image is visible. This increase continues with time, until the dye front has reached the exit (left side) and moved away from the right side, which is visible in decrease of intensity at the entrance side for the last image. For the second type of data set (Red channel) shown in FIG. 4f, the dye front moved into the nanochannels by some distance and did not leave the entrance side.

Dependence of image analysis methodology developed herein on these two types of different behavior of dye front must be considered, as will be discussed later. Another parameter that may change the output from PCA/MCR analysis is visibility of the dye front within the $1^{st}$ image in the sequence. The $1^{st}$ image in sequence for Green channel from 90 nm chip at 40V (FIG. 5), has a dye front within a channel. In horizontal average profile for this image (FIG. 6), it is seen that at the very beginning of image acquisition, the dye front has already moved in the nanochannels by approximately 100 pixels.

In Red channel image sequence (FIG. 4a-4e), another important feature must be noted. The dye front advances more into nanochannels at the top and bottom of the array in comparison with the middle part of the image. As was discussed in Experimental section, when performing manual calculations of velocity for such dataset, all parts of the image must be included to obtain a real average representative of front movement. MVA methods, however, due to the fact, that they don't model spatial relationship, take care of this problem automatically, as full image is used for modeling purposes.

From images (not shown) capturing both dyes for 160 nm, 8V. (images #1, 25, 50, 75 and 100), one distinguish the faster movement of the green dye relatively to the red. In gray scale images, however, no distinction is possible, as intensities of both channels are just summed up.

Application of MVA Methods to Image Sequences.

Figure 7:
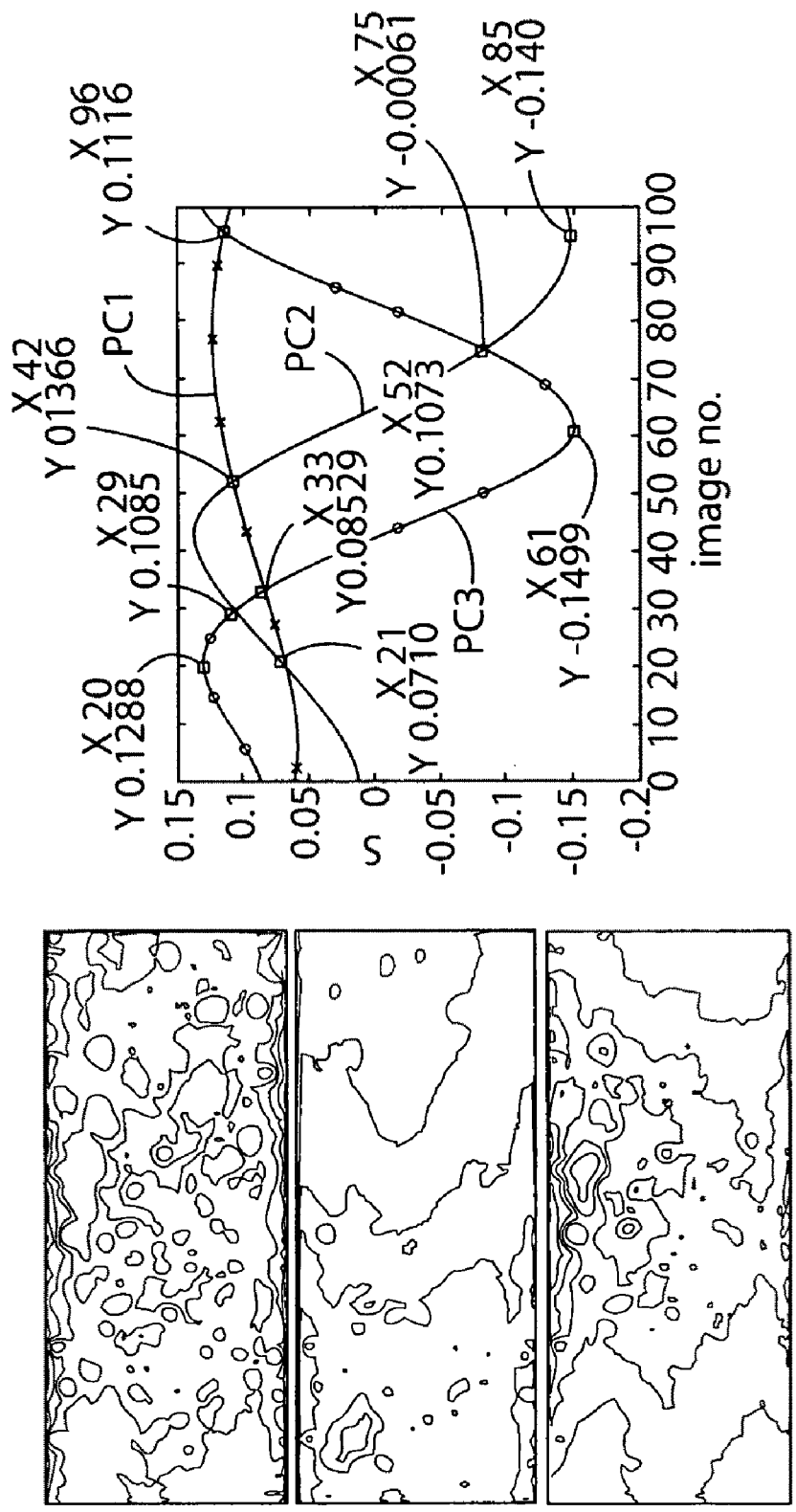
FIG. 7 shows PCA results for image series from Green channel, 160 nm, 8V. Three scores images and loading are shown. Image # (no.) is shown on the horizontal axis and intensity is shown on the vertical axis.
Figure 8:
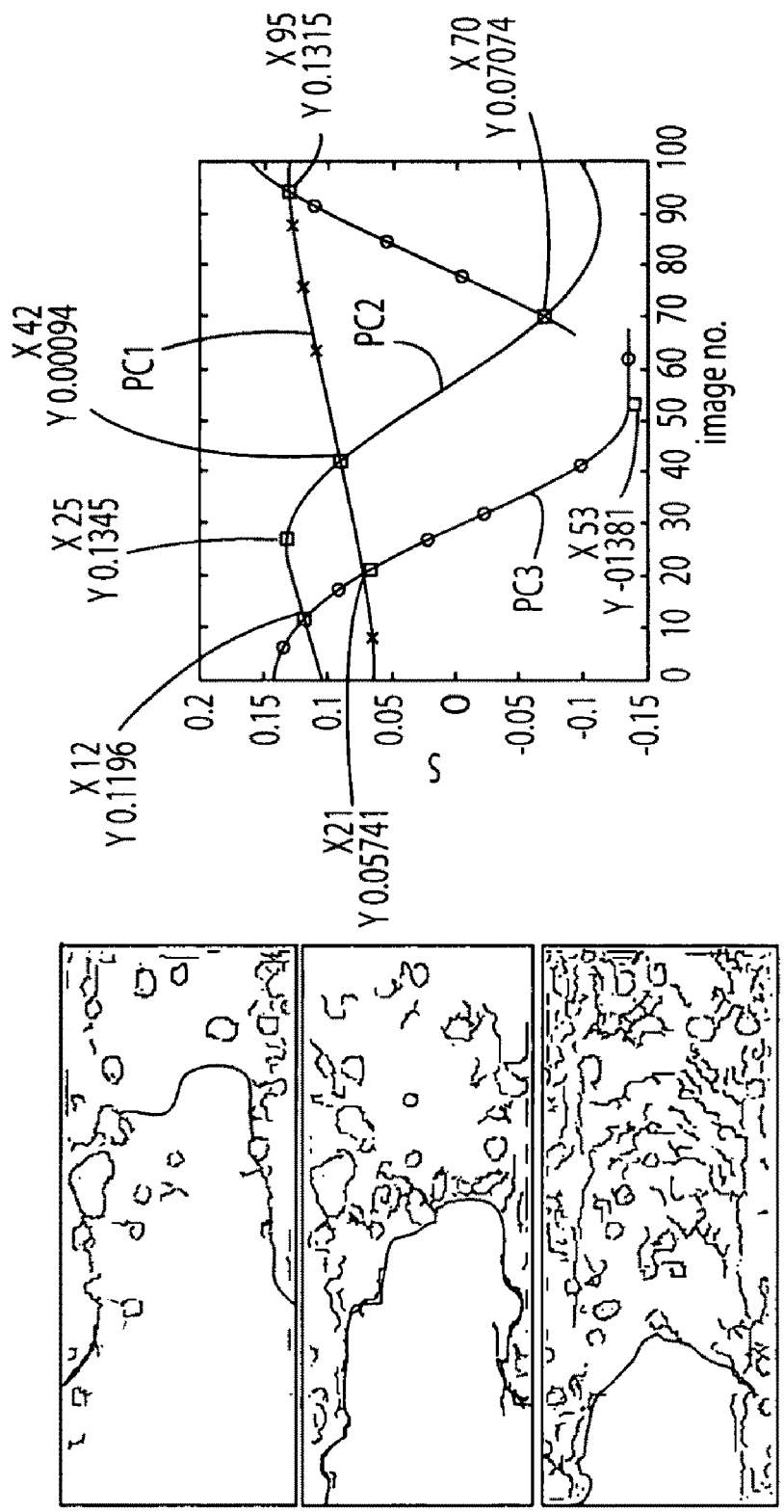
FIG. 8 shows PCA results for image series from Red channel, 160 nm, 8V. Three scores images and loading are shown. Image # is shown on the horizontal axis and intensity is shown on the vertical axis.

FIG. 7 show results of PCA applied to 100 images for Green 160 nm channel at 8V using no scaling option. Three PC's are extracted. The first PC1 loading increases gradually and reaches a maximum at around image #72. Its score image looks like completely filled channel. The second PC2 loading increases and reaches maximum at image #42 and then decreases down to minimum at image #95. Its score image looks like an inverse of the last image in the sequence. The $3^{rd}$ PC3 loading has a minimum at around image #61 and reaches the same level at the beginning and the end of the run. The score image for this component looks like inverse of the $1^{st}$ PC1. Negative values within images and loadings make it hard to interpret and identify extracted PCs. Results of PCA applied to the Red channel from the same datasets (FIG. 8) are similar to that of the Green channel, except the $2^{nd}$ PC2 loading does not have such pronounced maximum. The first PC1 also increases with time but does not have maximum as in case of Green channel. It might be due to the fact that dye is not leaving the nanochannels as it does in case of green dye. The $1^{st}$ PC1 score looks like the last image in the sequence. Interpretation of the $2^{nd}$ and $3^{rd}$ component is also complicated due to inverted images.

Figure 9:
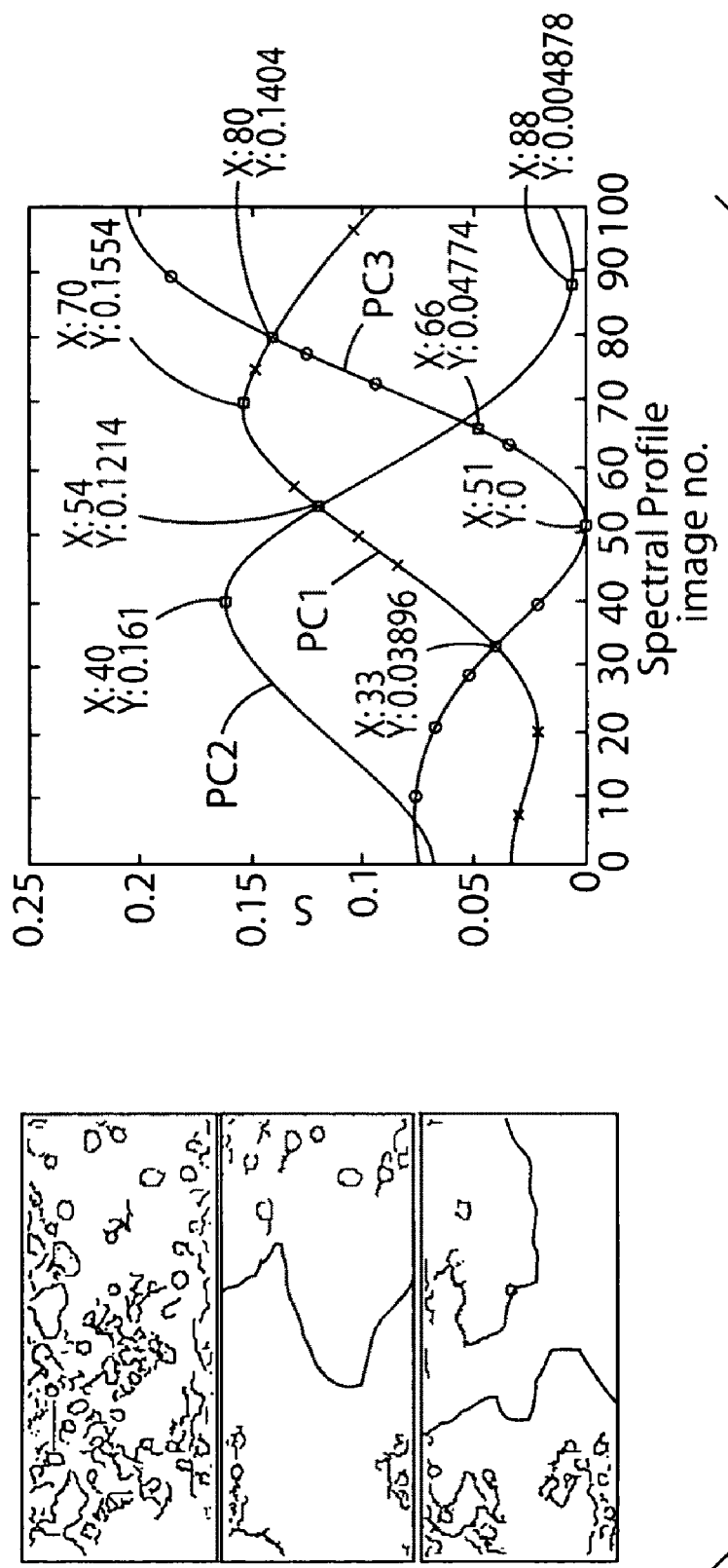
FIG. 9 shows MCR results for image series from Green channel, 160 nm, 8V. Three pure images and pure profiles are shown. Image # is shown on the horizontal axis and intensity is shown on the vertical axis.
Figure 10:
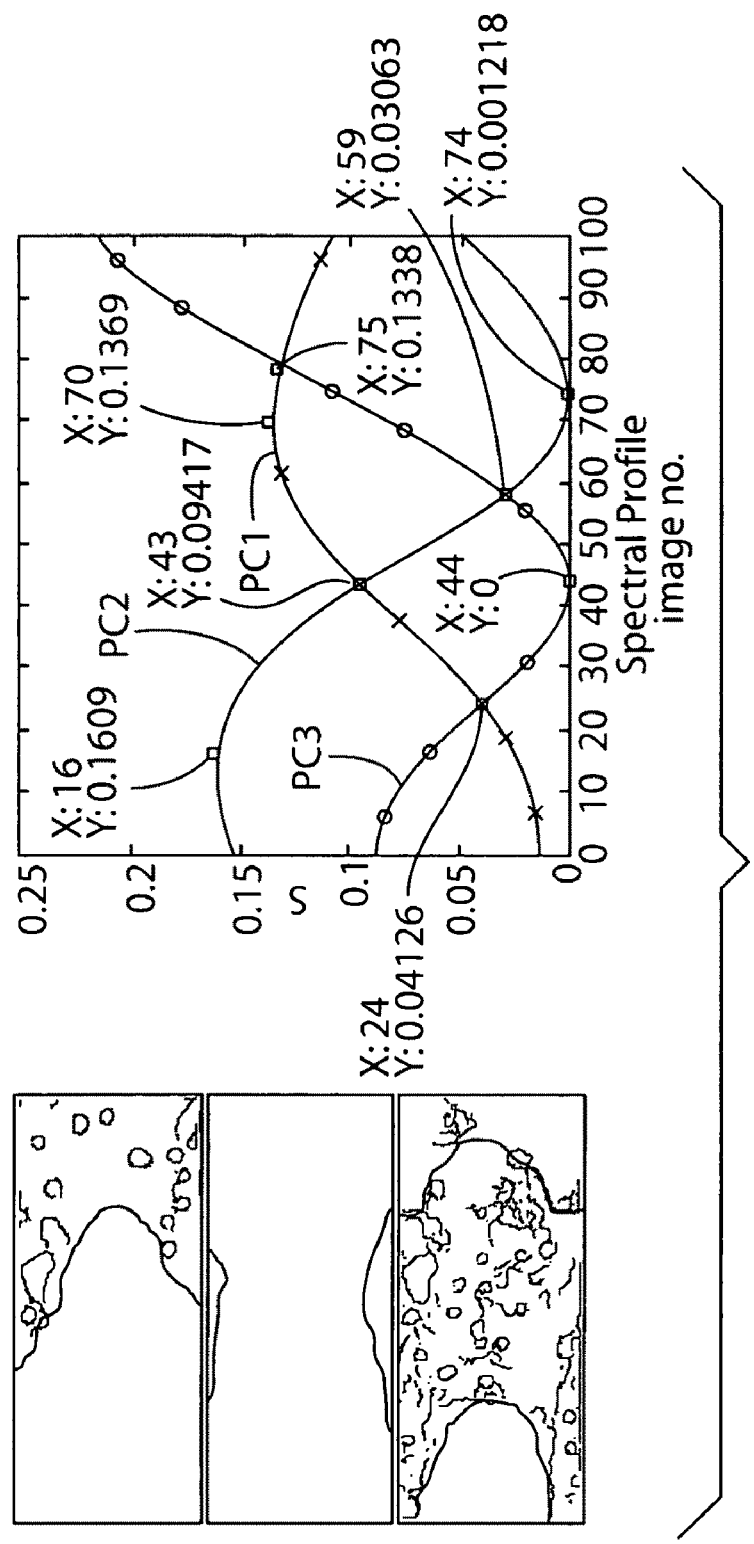
FIG. 10 shows MCR results for image series from Red channel, 160 nm, 8V. Three pure images and pure profiles are shown.

MCR results for Green channel from the same data set is shown in FIG. 9. Three pure images are displayed along with pure spectra. The first pure image represents filled nanochannels and it has a maximum at image #70 corresponding to time of evolution of 551 seconds. The second pure component represents half-way filled component and it increases till it reaches the maximum at image #40 and then decreases down to 0 loading at around image #88. The $3^{rd}$ pure component represents the last image in the dataset, when dye has moved out from the channel, and it reaches minimum at around image #51. MCR results for Red channel from the same experiment are shown in FIG. 10. This dataset is different from the green because the red dye does not leave the channel. The $1^{st}$ pure component PC1 represents the image in the middle of the sequence and it reaches maximum at around image #70. The $2^{nd}$ PC2 image represents the inverse of the images at the beginning of the sequence, and it decreases to a minimum at image #74. And PC3 looks like the last image in the sequence with dye front moved out from the entrance part of the channel, which is not observed in original image. Both green and red dyes were analyzed simultaneously, so movement of the green dye is reflected in the component extracted from Red channel. The $3^{rd}$ PC3 loading decreases down to a minimum at image #44 and then increases.

Figure 11:
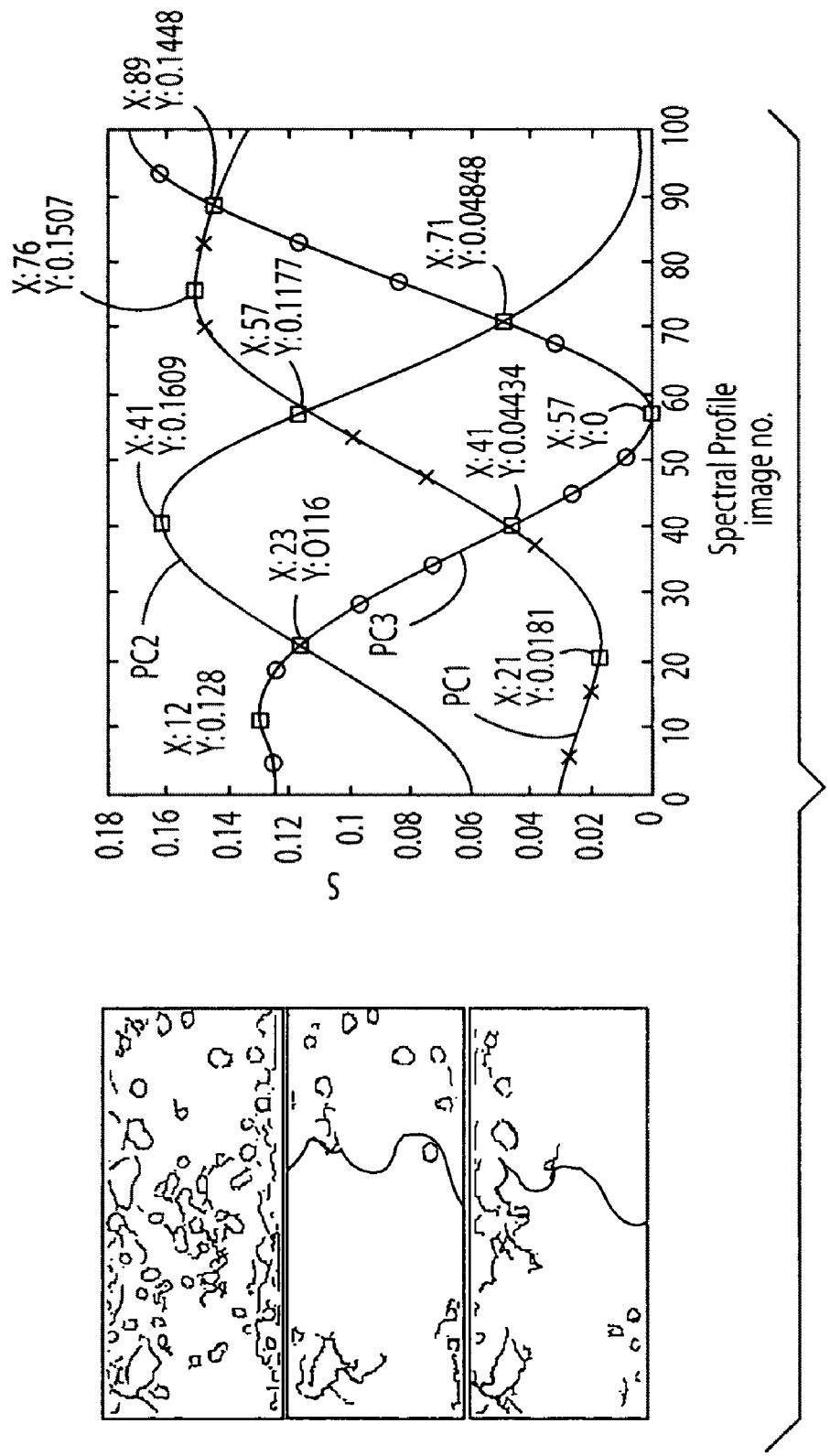
FIG. 11 shows MCR results for image series Mix (RGB converted to grayscale) at 160 nm, 8V. Three pure images and pure profiles are shown. Image # is shown on the horizontal axis and intensity is shown on the vertical axis.

MCR results from mix of two channels (FIG. 11) are similar in trends to the previously discussed. The $1^{st}$ pure image PC1 represents completely filled channel (last image in sequence), and it has a maximum at image #76. The $2^{nd}$ pure image PC2 represents a half-way filled channel and is similar to the last image in Red channel. The $3^{rd}$ pure image PC3 represents a green channel in which the dye moved out from the entrance side of the channel, and it reaches minimum at image #57.

For all image sequences analyzed for all three nanochannel sizes and all voltages, similar trends in MCR pure temporal profiles are extracted. The $1^{st}$ PC1 has a maximum, the $2^{nd}$ PC2 has a maximum and a minimum, and the $3^{rd}$ PC3 has a minimum at some image #. In addition, there are 4 intersections, one for $1^{st}$ with $2^{nd}$, one for $3^{rd}$ with $2^{nd}$ and two for $1^{st}$ and $3^{rd}$ pure components PC. These minimums, maximums and intersections of components provide equivalent of the time that may be related to the velocity. Table 2 shows minimum, maximums and intersections of components extracted from MCR applied to a subset of all image sequences analyzed.

Image sequences were subjected to MCR and corresponding velocities were calculated from all time equivalents shown in table 2 for distances determined from images manually from Table 1. This velocity was then compared with the velocity determined manually from horizontal line profiles. From this comparison, it was determined that intersections of the $3^{rd}$ with the $1^{st}$ and the $2^{nd}$ temporal pure profiles extracted by MCR provides the best estimate of velocity of both dyes within each single and mixed channel. There are two points of intersect for the $1^{st}$ and the $3^{rd}$ temporal profiles extracted by MCR. The first appears when the $1^{st}$ component PC1 just starts increasing and the $3^{rd}$ component PC3 starts decreasing. The second point of intersect is located where the first component PC1 starts decreasing after reaching a maximum, while the $3^{rd}$ component PC3 increases after reaching a minimum. This point represents a point at which the slower-moving dye has moved through the channel. There are two intersection points between $2^{nd}$ and $3^{rd}$ component PC2, PC3 as well. The first appears at the very beginning of the separation, while the second represents the time at which the faster-moving dye passed through the channel.

As seen from Table 2, the image numbers for intersections determined from each single channel and mixed channel are a little bit different. The slower the velocity (the larger the number of images in acquired sequence needed to capture the complete movement of the dye through the channel), the larger the difference in absolute image numbers. The differences in velocities determined from two single channels and mixed channel are approximately the same for all sizes of nanochannels and voltages. If one compares velocities calculates from MCR to manually calculated ones, then the error in the velocities determined from Green channel (both green and red dye), from mix channel (both green and red dye) and from Red channel (red dye) are 5-10%.

Figure 5:
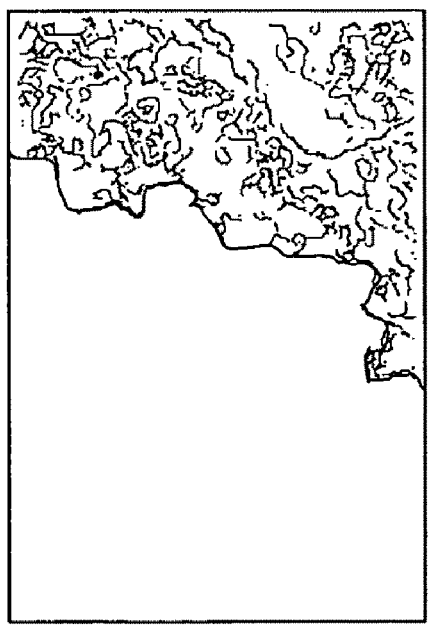
FIG. 5 shows original confocal image #1 for Green channel, 90 nm, 40V.
Figure 11A:
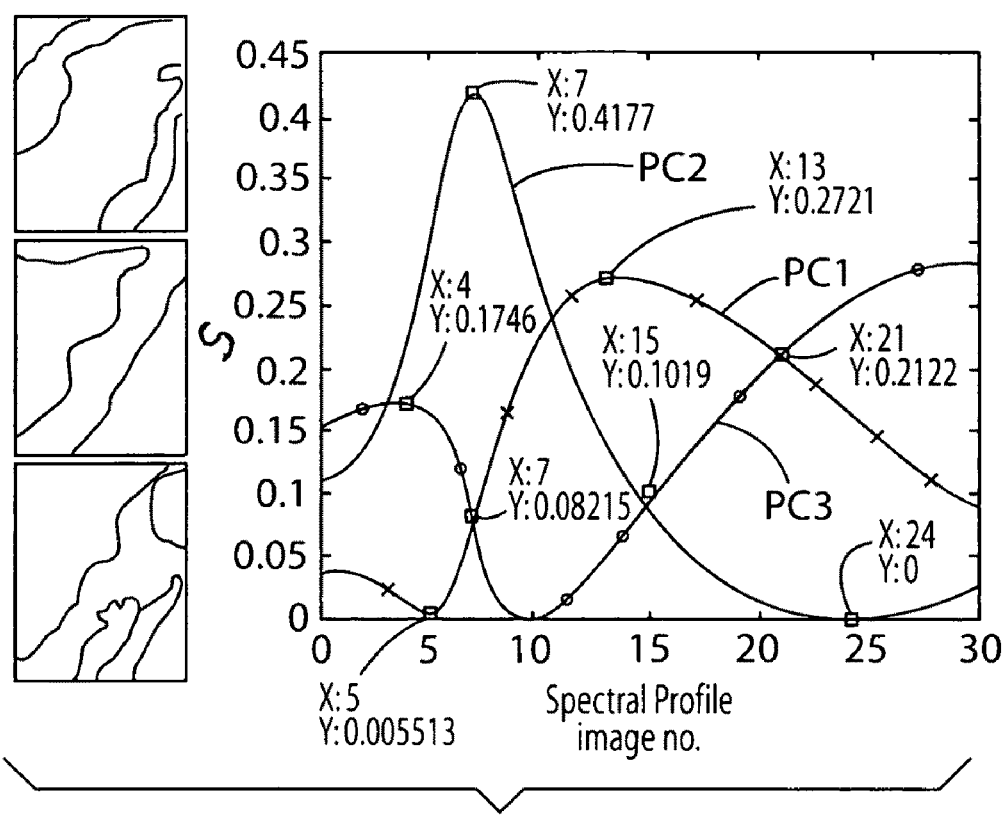
FIG. 11a shows MCR results for image series cropped from green channel, 90 nm, 40V. Three pure images and pure profiles are shown. Image # is shown on the horizontal axis and intensity is shown on the vertical axis.

It is important to determine whether it is necessary to preprocess images prior to MCR by cropping them so that the $1^{st}$ image does not have the front dye visible as in FIG. 5 and the last has the front moved all the way through the channel. Image #1 in a Green channel sequence from 90 nm, 40V, has a dye front moved in by approximately 100 pixels into the channel. MCR results of original and cropped images provide trends similar to all other datasets analyzed (FIG. 11a). The first PC1 reaches maximum and then decreases, the second PC2 reaches maximum earlier than the first and then reaches a minimum close to the end of the sequence and the third PC3 reaches deep minimum in the middle of the sequence. When the original images are used, the velocity is overestimated by almost 30%, while when the images are cropped as discussed above, the PC 1/3 intersection give an accurate estimate of velocity, taken that distance is calculated correctly. All image sequences containing a dye front in the $1^{st}$ image in the sequence were, thus, cropped to eliminate this effect. It was also determined that MCR results do not depend on the fact whether the dye front has reached the exit side of the image. It is very important observation, because in most of the cases when two dyes are analyzed simultaneously, by the time that one dye has reached the end, the other one has not. It is clear that is not necessary to preprocess images to be sure that both dyes have reached the exit. However, it is still critically important to accurately calculate the distance moved by the front dye in both Green and Red channels.

Absolute values of velocity determined through this methodology have an error due to errors in calculating an exact distance traveled and in cropping the image when the $1^{st}$ image has a front visible in it. But the same error will contribute to a velocity determined through manual procedure. What is important, however, is that the relative times determined from MCR for different dyes will be exactly proportional to the ratio of velocities. Table 3 represents the ratios of image numbers obtained from PC 1/3 and PC 2/3 intersections and velocities calculated by hand. All channels have ratios pretty close to those calculated by hand with an error of about 5%. The ratios of images determined by MCR are more accurate than those determined manually, due to what have been discussed previously, i.e. the fact that MCR uses full images to model the difference between them. So, one can manually calculate velocity for one channel and one dye and then use it as a reference to convert the image numbers obtained through MCR methodology to velocities in micron/second for all other channels and dyes.

One significant benefit of the invention is that, because single channels are influenced by the dye moving in the other channel, application of MCR to a single channel provides information on movement of both dyes. When an RGB image representing both dyes in the array of nanochannels is converted to a gray scale image and is analyzed by MVA methods, velocities of both dyes are extracted successfully. This potentially will allow identification of the transport velocity of different molecular species, even those tagged with the same fluorophore from RGB image sequences.

Validation for Early Stage of Separation

All of the results discussed above are obtained from series of images where the separation between two dyes is quite clear at the end of the experiment and the velocities can be quite accurately determined manually. Next it was validated and tested on set of 4 images acquired at the very early stage of separation, where very slight evidence of separation is detected. 9 images in the middle of the separation were used as a reference. Ratio of velocities determined from sequence of 9 images with clear separation by MCR was 1.25. The ratio obtained from MCR results of 4 images with no clear separation is 1.30. Even at very short time of experiment, MCR detected the separation between species and provided the ratio of velocities. This represents another very useful capability of optimizing time of experiments for separations.

(B) Capillary Electrophoresis Glass Chip

Figure 14:
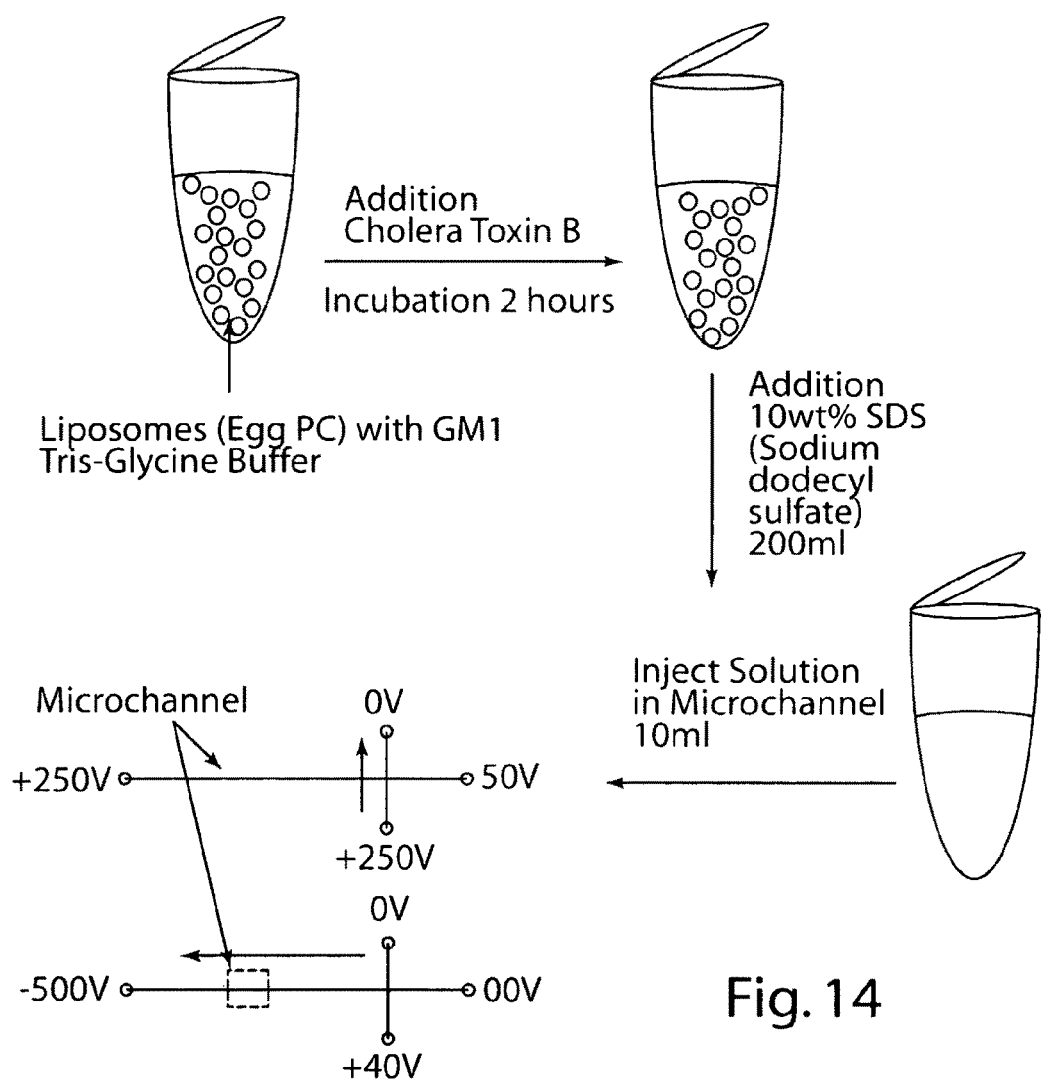
FIG. 14 is a schematic view of an embodiment of the invention for practicing capillary electrophoresis flow where a microchannel is shown with 250V at all ends for injection of a sample and the same microchannel shown again with positive and negative volts at different ends of the microchannel to transport the sample toward the exit end (−500V) as indicated by the dotted box and associated arrow.

FIG. 14 illustrates practice of an embodiment of the invention to carry out capillary electrophoresis on a glass chip where a solution of liposomes with GM1 tris-glycine buffer (ganglioside GM1) and cholera toxin subunit B (CTB) is injected into a microchannel illustrated with applied voltages in FIG. 14a at the beginning of injection. For example, +250 V is applied at all three ends of the microchannel as shown at injection. FIG. 14 also shows the positive and negative voltages applied to the same microchannel after the solution reaches the T-junction of the microchannel in order to move the front of the GM1/CBT complex represented by the dotted box and associated arrow through the microchannel toward the microchanel exit end (where the −500V is applied). The microchannel has dimensions of 50 microns in width and 20 microns in depth with the bottom of the microchannel having radiused corners. A series of images was obtained and image analysis was performed using PCA and MCR in the manner described above. GM1 was tagged or labeled with the above-described red dye and CTB was tagged with the above-described green dye, although the results of the method indicate the molecules do not need to be labeled in order to distinguish between different velocities.

Figure 15:
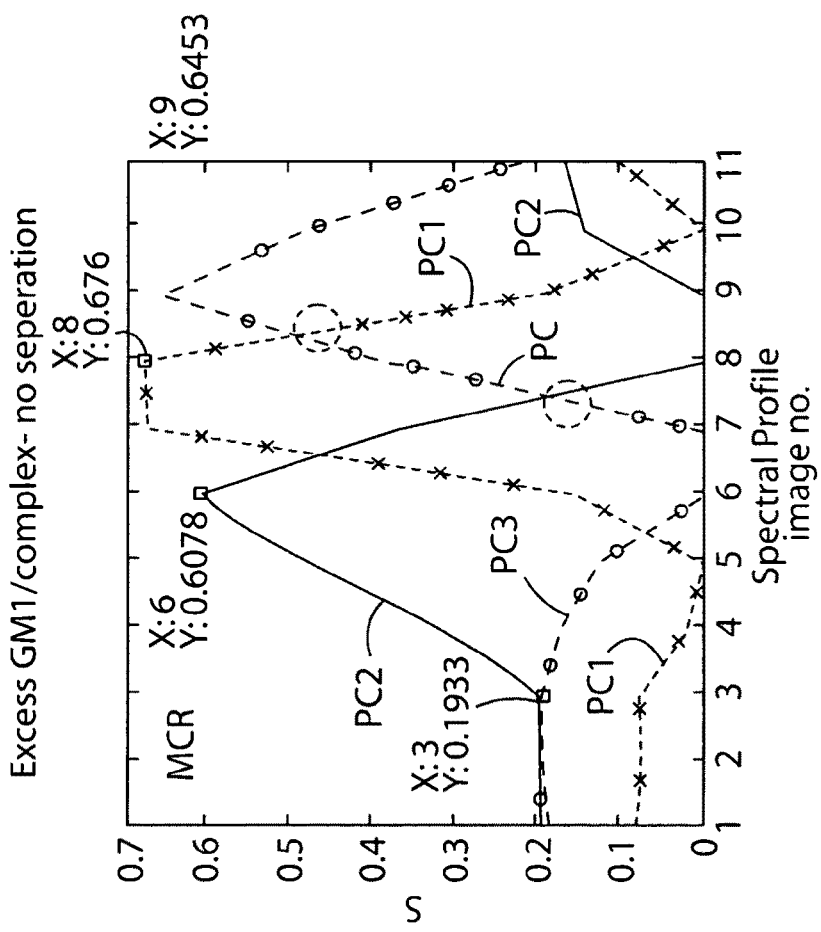
FIG. 15 shows MCR results before separation of the GM1/complex when tested as shown in FIG. 14.
Figure 16:
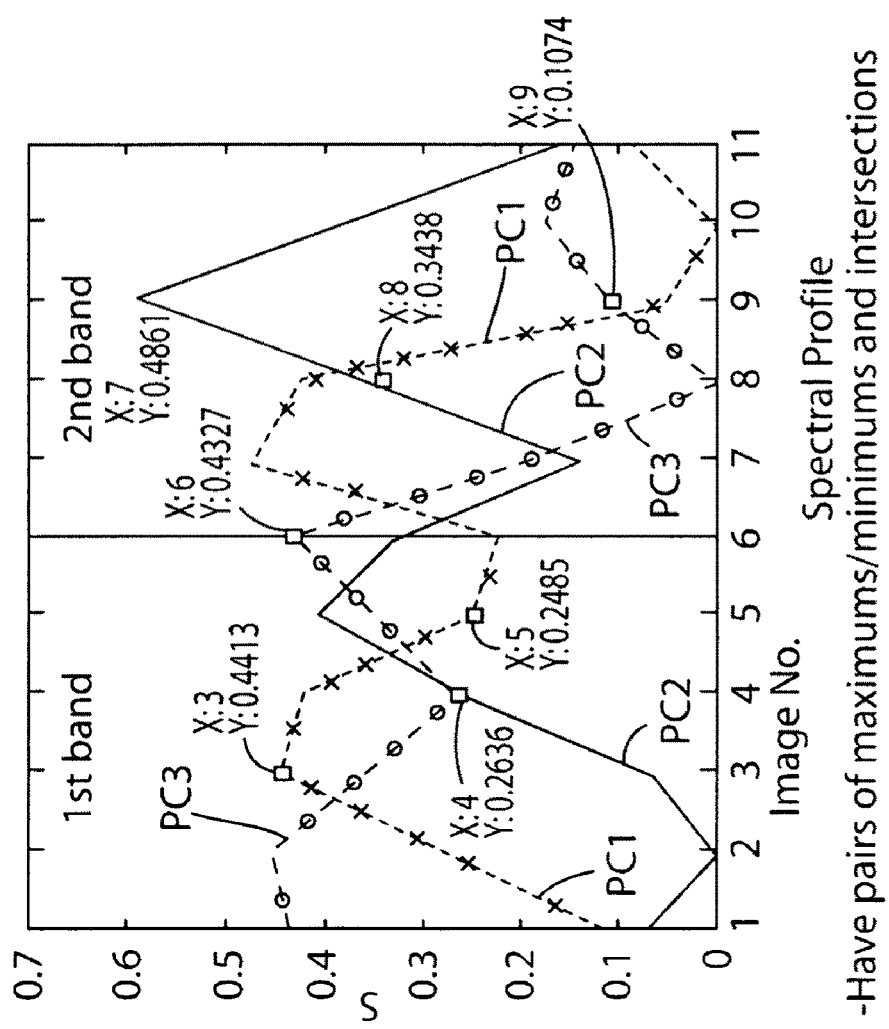
FIG. 16 shows MCR results after separation of the GM1/complex when tested as shown in FIG. 14 wherein the first band visible excess GM1 itself and the second band is visible due to the complex between GM1 and CTB.

FIG. 15 shows MCR results obtained before separation of the GM1/complex where a velocity ratio of 1.15 to 1.17 was obtained for GM1/complex according to the ratio of intersection of the $3^{rd}$ components PC3 with the $1^{st}$ component PC1 to that with the $2^{nd}$ component PC2, representing the ratio of velocities according to the developed model described above for the region of the microchannel with no clear separation. FIG. 16 shows MCR results after separation of the GM1/complex wherein the first band visible excess GM1 itself and the second band is visible due to the complex between GM1 and CTB. The MCR results produced a ratio of velocities of 1.26-1.36 compared to 1.33 for manual-determined ratio.

Figure 17:
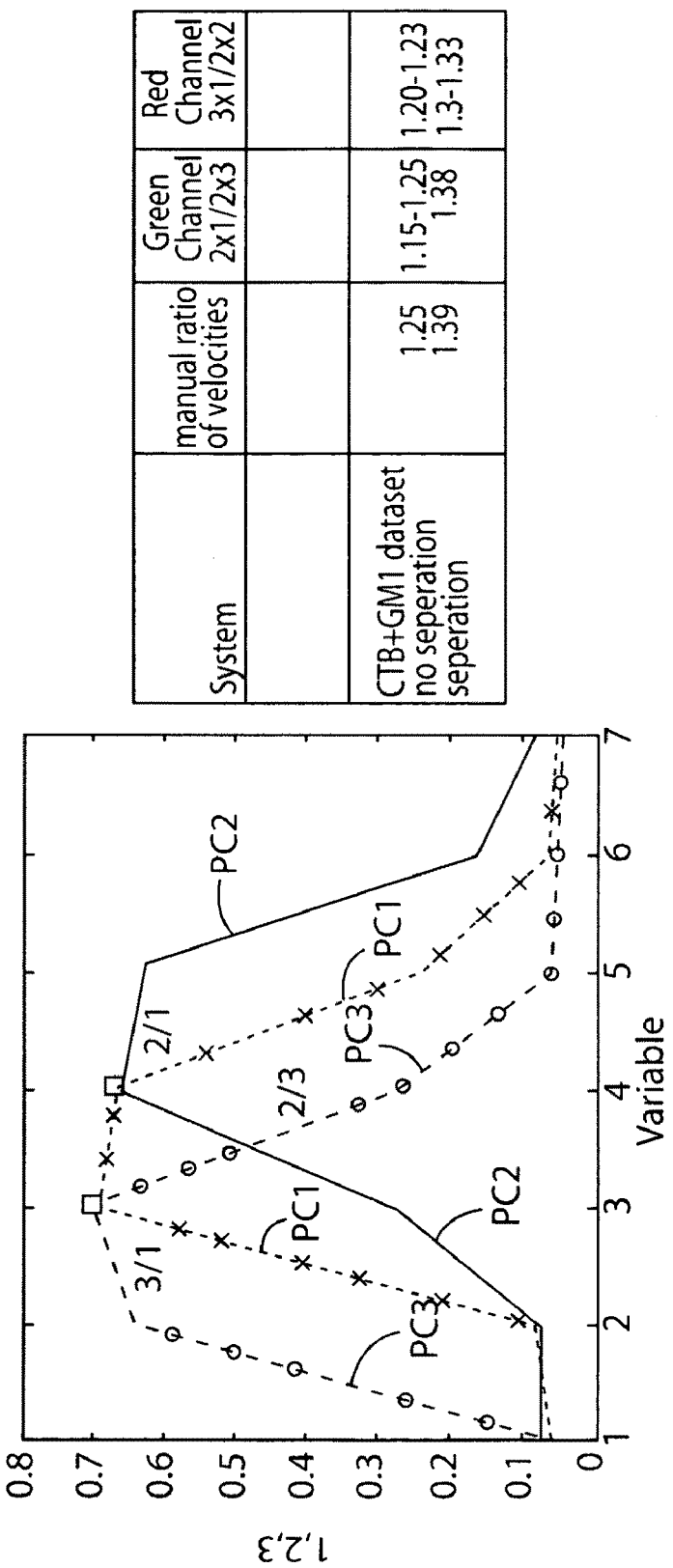
FIG. 17 shows MCR results before and after separation of the GM1/complex when tested as shown in FIG. 14 wherein image series analysis is performed using PARAFAC.

FIG. 17 shows MCR results before and after separation of the GM1/complex when tested as shown in FIG. 14 wherein image series analysis is performed using PARAFAC, which is able to provide ratios of velocities of GM1 and the complex even when no clear separation can be confirmed visually.

(C) Gel Electrophoresis

Figure 18:
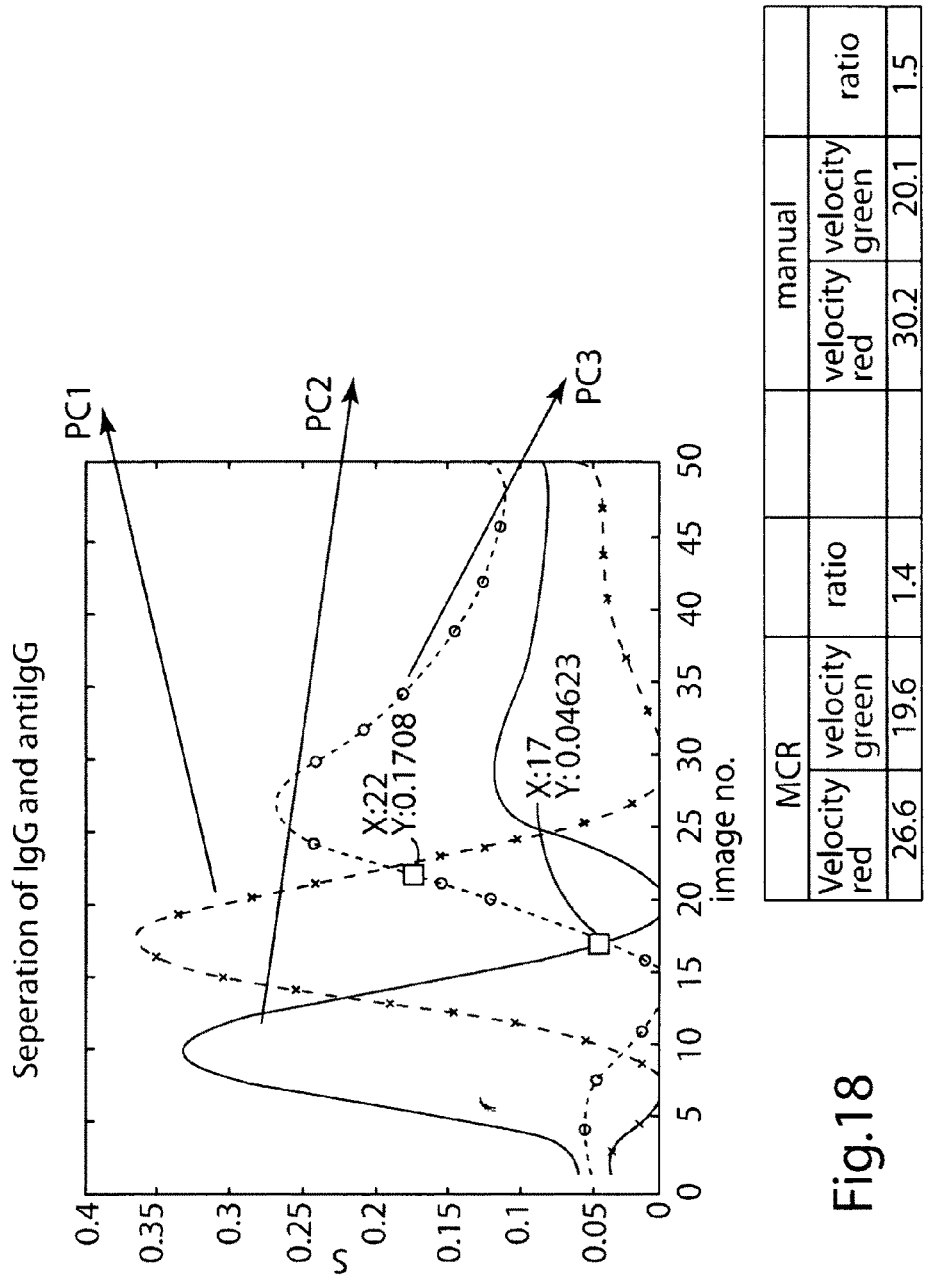
FIG. 18 illustrates MCR results for gel electrophoresis of a liquid solution of IGg (immunoglobulin G) and antiIGg (immunoglobulin G). Image # is shown on the horizontal axis and intensity is shown on the vertical axis.

FIG. 18 illustrates MCR results in the practice of an embodiment of the invention to carry out gel electrophoresis of a liquid solution of IGg (immunoglobulin G) and antiIGg (immunoglobulin G) in a microchannel similar to those described above using applied voltages. The microchannel is filled with hydrogel (e.g. polyacrylamides) and the liquid solution of the IGg and antiIGg is injected into the gel at wells formed therein at the microchannel entry followed by application of the applied voltages to move the IGg and antiIGg molecules through the microchannel toward the positive voltage (or negative voltage depending on the molecular charges involved) applied at the exit end of the microchannel. IGg was tagged or labeled with the above-described red dye and anti-IGg was tagged with the above-described green dye, although the results of the method indicate the molecules do not need to be labeled in order to distinguish between different velocities.

FIG. 18 illustrates an MCR red velocity of 26.6 pixels/second, green velocity of 19.6 pixels/second, and ratio of velocities of 1.4 compared to the manual values shown.

The present invention employs multivariate analysis methods such as MCR successfully to provide a time equivalent of moving molecular fronts within array of nanochannels and to detect the separation of species and provide a ratio of their velocities will assist in optimizing separation experiments and saving time. From MCR results, a criteria was determined that can be used to calculate velocities of two dyes separating within nanochannels. The methodology relies upon an accurate determination of distance traveled by each dye. The ratio of velocities of faster and slower moving dyes within nanochannels determined from MCR represents much more accurate ratio than that obtained manually. Identification of the transport velocity of different molecular species, even those tagged with the same fluorophore, and thus their tendency towards separation, can be accomplished through the use of multivariate image analysis techniques. Such image analysis method can yield significant information on transport processes of complex mixtures within nanochannel arrays without the necessity to acquire all emitting wavelengths.

TABLE 1

Image sequence description.

| size | V | channel | # of images | total t, sec | Distance travelled, mm |
|---|---|---|---|---|---|
| 50 nm | 15 | G | 36 | 180 | 2000 |
|  |  | R |  |  | 616 |
|  | 20 | G | 25 | 125 | 2000 |
|  |  | R |  |  | 312 |
|  | 60 | G | 36 | 180 | 2000 |
|  |  | R |  |  | 1478 |
| 90 nm | 40 | G | 30 | 150 | 625 |
|  |  | R |  |  | 586 |
| 160 nm | 8 | G | 100 | 787 | 2000 |
|  |  | R |  |  | 2000 |
|  | 24 | G | 59 | 464 | 2000 |
|  |  | R |  |  | 2000 |
|  | 50 | G | 40 | 315 | 2000 |
|  |  | R |  |  | 2000 |

TABLE 2

Results of MCR. Image #'s corresponding to minimums, maximums and intersections

|  | 160 nm 8 V | | | 160 nm 50 V | | | 90 nm 40 V | | |
| --- | --- | --- | --- | --- | --- | --- | --- | --- | --- |
|  | green | red | mix | Green | red | mix | Green | Red | Mix |
| 1 max/min | 70 | 68 | 23/76 | 22 | 14/32 | 24 | 11 | 13 | 10 |
| 2 max | 40 | 16 | 41 | 13 | 18 | 13 | 6 | 7 | 6 |
| 2 min | 87 | 74 |  | 29 |  |  | 21 | 24 | 22 |
| 3 max |  |  | 56 | 36 | 12 |  | 26 | 4 | 3/26 |
| 3 min | 51 | 44 |  | 18 | 26 | 16 | 8 | 10 | 9 |
| ½ cross | 54 | 43 | 58 | 18 | 25 | 18 | 9 | 11 | 10 |
| ⅓ cross | 33/80 | 24/79 | 41/89 | 11/29 | 13/31 | 11/30 | 6/19 | 7/22 | 6/21 |
| ⅔ cross | 66 | 59 | 23/71 | 24 | 24 | 25 | 11 | 14 | 13 |

TABLE 3

Comparison of ratios of image #'s extracted from MCR with velocity ratio calculated manually

|  | 160 nm 8 V | | | 160 nm 50 V | | | 90 nm 40 V | | |
| --- | --- | --- | --- | --- | --- | --- | --- | --- | --- |
|  | image # from MCR | velocity, MCR | velocity, manual | image # from MCR | velocity, MCR | velocity, manual | image # from MCR | velocity, MCR | velocity, manual |
| green Main | 66 | 3.8 | 4 | 24 | 10.6 | 11 | 11 | 7.9 | 7 |
| Red in Green | 80 | 3.2 | 3 | 29 | 8.8 | 9 | 19 | 4.6 | 4 |
| Ratio | 1.21 |  | 1.33 | 1.21 |  | 1.22 | 1.73 |  | 1.75 |

TABLE 3-continued

Comparison of ratios of image #'s extracted from MCR with velocity ratio calculated manually

| | 160 nm 8 V | | | 160 nm 50 V | | | 90 nm 40 V | | |
|---|---|---|---|---|---|---|---|---|---|
| | image # from MCR | velocity, MCR | velocity, manual | image # from MCR | velocity, MCR | velocity, manual | image # from MCR | velocity, MCR | velocity, manual |
| green in Red | 59 | 4.3 | 4 | 24 | 10.6 | 11 | 14 | 6.2 | 7 |
| Red Main | 79 | 3.2 | 3 | 31 | 8.2 | 9 | 22 | 4.0 | 4 |
| Ratio | | 1.34 | 1.33 | | 1.29 | 1.22 | | 1.57 | 1.75 |
| Mix Green | 71 | 3.6 | 4 | 25 | 10.2 | 11 | 13 | 6.7 | 7 |
| Mix Red | 89 | 2.9 | 3 | 30 | 8.5 | 9 | 21 | 4.1 | 4 |
| Ratio | | 1.25 | 1.33 | | 1.20 | 1.22 | | 1.62 | 1.75 |

Although the invention has been described above with respect to certain illustrative embodiments thereof, changes and modification can be made therein with the scope of the present invention as set forth in the appended claims.

REFERENCES

1. Garcia, A. L.; Ista, L. K.; Petsev, D. N.; O'Brien, M. J.; Bisong, P.; Mammoli, A. A.; Brueck, S. R. J.; Lopez, G. P., Electrokinetic molecular separation in nanoscale fluidic channels. *Lab on a Chip* 2005, 5, (11), 1271-1276.
2. Yuan, Z.; Garcia, A. L.; Lopez, G. P.; Petsev, D. N., Electrokinetic transport and separations in fluidic nanochannels. *Electrophoresis* 2007, 28, (4), 595-610.
3. Lowry, M.; He, Y.; Geng, L., Imaging Solute Distribution in Capillary Electrochromatography with Laser Scanning Confocal Microscopy. *Analytical Chemistry* 2002, 74, 1811-1818.
4. Bellan, L. M.; Craighead, H. G.; Hinestroza, J. P., Direct measurement of fluid velocity in an electrospinning jet using particle image velocimetry. *Journal of Applied Physics* 2007, 102, (9).
5. Grega, L.; McGarry, M.; Begum, M.; Abruzzo, B., Flow characterization of a polymer electronic membrane fuel cell manifold and individual cells using particle image velocimetry. *Journal of Fuel Cell Science and Technology* 2007, 4, (3), 272-279.
6. Sinton, D., Microscale flow visualization. *Microfluidics and Nanofluidics* 2004, 1, (1), 2-21.
7. Natrajan, V. K.; Christensen, K. T., Microscopic particle image velocimetry measurements of transition to turbulence in microscale capillaries. *Experiments in Fluids* 2007, 43, (1), 1-16.
8. Markov, D. A.; Dotson, S.; Wood, S.; Bornhop, D. J., Noninvasive fluid flow measurements in microfluidic channels with backscatter interferometry. *Electrophoresis* 2004, 25, (21-22), 3805-3809.
9. Bergsma, C. B. J.; Streekstra, G. J.; Smeulders, A. W. M.; Manders, E. M. M., Velocity estimation of spots in three-dimensional confocal image sequences of living cells. *Cytometry* 2001, 43, (4), 261-272.
10. Dittrich, P. S.; Schwille, P., Spatial two-photon fluorescence cross-correlation Spectroscopy for controlling molecular transport in microfluidic structures. *Analytical Chemistry* 2002, 74, (17), 4472-4479.
11. Horn, B. K. P.; Schunck, B. G., DETERMINING OPTICAL-FLOW—A RETROSPECTIVE. *Artificial Intelligence* 1993, 59, (1-2), 81-87.
12. Tagliasacchi, M., A genetic algorithm for optical flow estimation. *Image and Vision Computing* 2007, 25, (2), 141-147.
13. Jaumot, J.; Vives, M.; Gargallo, R., Application of multivariate resolution methods to the study of biochemical and biophysical processes. *Analytical Biochemistry* 2004, 327, (1), 1-13.
14. Adams, M. J., *Chemometrics in Analytical Spectroscopy*. Royal Society of Chemistry: Cambridge, 1995.
15. Malinowski, E. R., *Factor Analysis in Chemistry*. Wiley: New York, 1991.
16. Gurden, S. P.; Lage, E. M.; de Faria, C. G.; Joekes, I.; Ferreira, M. M. C., Analysis of video images from a gas-liquid transfer experiment: a comparison of PCA and PARAFAC for multivariate image analysis. *Journal of Chemometrics* 2003, 17, (7), 400-412.
17. Sahouria, E.; Zakhor, A., Content analysis of video using principal components. *Ieee Transactions on Circuits and Systems for Video Technology* 1999, 9, (8), 1290-1298.
18. Wise, B.; Geladi, P., A Brief Introduction to Multivariate Image Analysis (MIA). In http://www.eigenvector.com/Docs/MIA_Intro.pdf
19. Windig, W.; Guilment, J., INTERACTIVE SELF-MODELING MIXTURE ANALYSIS. *Analytical Chemistry* 1991, 63, (14), 1425-1432.
20. Tauler, R.; Smilde, A.; Kowalski, B., SELECTIVITY, LOCAL RANK, 3-WAY DATA-ANALYSIS AND AMBIGUITY IN MULTIVARIATE CURVE RESOLUTION. *Journal of Chemometrics* 1995, 9, (1), 31-58.
21. de Juan, A.; Tauler, R.; Dyson, R.; Marcolli, C.; Rault, M.; Maeder, M., Spectroscopic imaging and chemometrics: a powerful combination for global and local sample analysis. *Trac-Trends in Analytical Chemistry* 2004, 23, (1), 70-79.
22. *MATLAB: The Language of Technical Computing.*, The Mathworks, Inc., Natick, Mass.
23. *PLS Toolbox* 4.1, Eigenvector Research Inc.

We claim:

1. A method of determining transport velocity ratio for different molecular species moving through a fluid medium in a channel, comprising obtaining multiple temporal images of the channel with the species moving through the medium therein, analyzing the temporal images using multivariate image analysis to obtain temporal profiles of principal components, and determining a ratio of velocities of the species using a ratio of times of intersection of the temporal profiles of certain principal components.

2. The method of claim 1 including obtaining multiple temporal images of the channel with the fluid medium having the different species simultaneously moving through the medium by differential molecular transport.

3. The method of claim 2 including determining individual velocity of one or more of the different species using the temporal profiles.

4. The method of claim 3 including identifying the one or more species using the individual velocity.

5. The method of claim 2 wherein the multiple temporal images are obtained before separation of the different molecular species.

6. The method of claim 1 wherein the ratio of velocities of the different species is determined from a ratio of image numbers that represent the times of intersection of the temporal profiles of certain principal components.

7. The method of claim 1 wherein the ratio of velocities is determined using the ratio of times of intersection of the temporal profiles of one of the different species only.

8. The method of claim 1 wherein the multivariate image analysis includes using principal components analysis (PCA) and multivariate curve resolution (MCR) to provide the principal components.

9. The method of claim 1 wherein the medium resides in a nanochannel.

10. The method of claim 9 wherein the nanochannel is formed on a chip.

11. The method of claim 1 that employs electrophoresis.

12. The method of claim 1 that employs capillary electrophoresis.

13. The method of claim 1 that employs gel electrophoresis.

14. The method of claim 1 wherein the temporal images are obtained using a confocal fluorescence microscope.

15. The method of claim 1 including identifying multiple species using individual velocities or the ratio of velocities.

* * * * *